United States Patent
Aydin et al.

(10) Patent No.: US 10,105,758 B2
(45) Date of Patent: Oct. 23, 2018

(54) ARRANGEMENT FOR COATING A POWDER

(71) Applicant: Siemens Aktiengesellschaft, Munich (DE)

(72) Inventors: Omer Aydin, Berlin (DE); Heinz Pilz, Teltow (DE); Martin Schaefer, Berlin (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 0 days.

(21) Appl. No.: 14/894,584

(22) PCT Filed: May 13, 2014

(86) PCT No.: PCT/EP2014/059737
§ 371 (c)(1),
(2) Date: Nov. 30, 2015

(87) PCT Pub. No.: WO2014/191200
PCT Pub. Date: Dec. 4, 2014

(65) Prior Publication Data
US 2016/0121397 A1    May 5, 2016

(30) Foreign Application Priority Data

May 28, 2013 (DE) .......................... 10 2013 209 963
Aug. 20, 2013 (DE) .......................... 10 2013 216 439

(51) Int. Cl.
*B05C 19/00* (2006.01)
*B22F 1/02* (2006.01)
(Continued)

(52) U.S. Cl.
CPC ............... *B22F 1/02* (2013.01); *B05C 19/00* (2013.01); *B05C 19/04* (2013.01); *B22F 1/0003* (2013.01);
(Continued)

(58) Field of Classification Search
CPC ....... B05C 19/00; B05C 19/04; B05C 19/008; B05C 19/001; B22F 1/0003; B22F 1/02;
(Continued)

(56) References Cited

U.S. PATENT DOCUMENTS 4,564,150 A * 1/1986 Keene ................ B65H 19/1821
242/422.7
5,289,985 A * 3/1994 Cocchi ................ B65H 19/123
242/559

(Continued)

FOREIGN PATENT DOCUMENTS

CN       102380825 A      3/2012    ............. B24B 49/12
CN       202239627 U      5/2012    ............. B22F 3/105
(Continued)

OTHER PUBLICATIONS

Chinese Office Action, Application No. 2014800419155, 14 pages, dated Sep. 5, 2016.
(Continued)

*Primary Examiner* — Yewebdar T Tadesse
(74) *Attorney, Agent, or Firm* — Slayden Grubert Beard PLLC (57) ABSTRACT

An arrangement includes a processing chamber, a coating platform located in the processing chamber, and a coating device with a coating element located in the processing chamber for coating a metal or ceramic powder. The arrangement also has an exchanging device for exchanging at least one portion of the coating element with another portion of the same coating element or for exchanging the entire coating element with another coating element within the processing chamber when the processing chamber is closed. The exchanging device can include a multiple head, e.g., a pivoting head or revolving head, an exchanging station, and/or a moving device that allows a coating element portion that is to be exchanged to be moved or pushed (Continued)

away. A part of the coating element can also be rolled on a supply roller, and the coating element portion can be exchanged by unrolling the coating element from the supply roller.

10 Claims, 7 Drawing Sheets (51) Int. Cl.
 *B05C 19/04* (2006.01)
 *B22F 3/105* (2006.01)
 *B29C 67/00* (2017.01)
 *B22F 1/00* (2006.01)
(52) U.S. Cl.
 CPC ........ *B22F 3/1055* (2013.01); *B29C 67/0077* (2013.01); *B22F 2003/1056* (2013.01); *Y02P 10/295* (2015.11)
(58) Field of Classification Search
 CPC ........... B22F 2003/1056; B22F 3/1055; B29C 67/0077; Y02P 10/295
 USPC ....... 118/308, 309, 319; 425/174.4; 264/497
 See application file for complete search history.

(56) References Cited

U.S. PATENT DOCUMENTS

| 6,071,550 | A | 6/2000 | Ueberschar et al. ............. 427/8 |
| 6,215,093 | B1 | 4/2001 | Meiners et al. ......... 219/121.61 |
| 2002/0186370 | A1* | 12/2002 | Roesner ................ B23Q 17/09 356/301 |
| 2006/0192322 | A1* | 8/2006 | Abe ..................... B22F 3/1055 264/497 |
| 2010/0204028 | A1* | 8/2010 | Geissler ............... B23Q 3/1572 483/51 |
| 2011/0203433 | A1* | 8/2011 | Brussel .................... D01G 1/04 83/74 |
| 2012/0041586 | A1* | 2/2012 | Abe ...................... B22F 3/1055 700/120 |
| 2012/0285302 | A1* | 11/2012 | Bergami ................ B23Q 17/24 83/13 |

FOREIGN PATENT DOCUMENTS

| DE | 1918137 U | 6/1965 | |
| DE | 4325573 A1 | 2/1995 | .............. B05B 7/22 |
| DE | 4402226 A1 | 8/1995 | ............ B05C 11/04 |
| DE | 19649865 C1 | 2/1998 | ............ B22F 3/105 |
| DE | 19731947 A1 | 1/1999 | ............ B05C 11/04 |
| DE | 69914492 T2 | 12/2004 | ............ B05C 11/02 |
| DE | 102006056422 B3 | 4/2008 | ............ B22F 3/105 |
| DE | 202008017386 U1 | 7/2009 | ............ B05B 11/02 |
| DE | 102009056065 A1 | 6/2011 | ............... A24C 5/24 |
| EP | 0466006 A2 | 1/1992 | ............ B05C 11/02 |
| EP | 1439050 A1 | 7/2004 | ................ B22F 3/00 |
| WO | 2014/191200 A1 | 12/2014 | ............ B22F 3/105 |

OTHER PUBLICATIONS

Kaddar, Wesam, "Die generative Fertigung mittels Laser-Sintern: Scanstrategien, Einflüsse verschiedener Prozessparameter auf die mechanischen und optischen Eigenschaften beim LS von Thermoplasten und deren Nachbearbeitungsmöglichkeiten" Dissertation, von der Fakultät für Ingenieurswissenschaften, Abteilung Maschinenbau und Verfahrenstechnik der Universitat Duisburg-Essen zur Erlangung des akademischen Grades Dr.-Ing., German language w/ English abstract, 4 pages, dated Nov. 17, 2010.
German Office Action, Application No. 102013209963.0, 5 pages, dated Mar. 3, 2014.
International Search Report and Written Opinion, Application No. PCT/EP2014/059737, 18 pages, dated Oct. 22, 2014.

* cited by examiner

ARRANGEMENT FOR COATING A POWDER

CROSS-REFERENCE TO RELATED APPLICATIONS

This application is a U.S. National Stage Application of International Application No. PCT/EP2014/059737 filed May 13, 2014, which designates the United States of America, and claims priority to DE Application No. 10 2013 209 963.0 filed May 28, 2013, the contents of which are hereby incorporated by reference in their entirety.

TECHNICAL FIELD

The invention pertains to an arrangement with a process chamber, a coating platform located in the process chamber and a coating device with a coating element located in the process chamber for the coating of a powder, especially a metallic or ceramic powder.

BACKGROUND

Such an arrangement is described for example in the doctoral thesis "Generative manufacturing by means of laser sintering: scan strategies, influences of various process parameters on the mechanical and optical properties during LS of thermoplastics and their further processing possibilities" (Wesam Kaddar, of the College of Engineering Sciences, Department of Machine Building and Process Engineering of the University of Duisburg-Essen, to obtain the academic degree of Dr.-Ing., approved dissertation, 17 Nov. 2010).

The problem exists in powder coating arrangements that the coating elements used for the coating become worn over time on account of the mechanical stresses which occur and the coating quality diminishes over time. In order to ensure an adequate coating quality, one must accordingly replace the coating elements used at regular intervals.

SUMMARY

One embodiment provides an arrangement with a process chamber, a coating platform located in the process chamber and a coating device with a coating element located in the process chamber for the coating of a powder, especially a metallic or ceramic powder, wherein the arrangement has an exchanging device which is suitable for replacing at least one portion of the coating element with another portion of the same coating element or for replacing the entire coating element with another coating element within the process chamber and when the process chamber is closed.

In a further embodiment, the exchanging device has a multiple head, especially a swivel head or revolver head, on which at least two coating elements are fastened, which can be optionally selected and activated for the coating of the powder on the coating platform.

In a further embodiment, the exchanging device has an exexchanging station, in which one or more other coating elements are stockpiled, and a transport device, and the transport device is suitable for replacing the coating element activated in each case for the coating of the powder with one of the other coating elements which are stockpiled in the exexchanging station.

In a further embodiment, the exchanging device has a moving device, which enables a moving of a portion of the activated coating element being exchanged relative to the coating platform, such that the portion of the coating element being exchanged is pushed out from its assigned coating portion on the coating platform and is replaced by another portion of the same coating element.

In a further embodiment, one part of the coating element is wound onto a supply roller and the exchanging device is configured such that it rolls off a sub-portion of the coating element from the supply roller for exchanging a portion of the coating element to be replaced and rolls up another sub-portion of the coating element onto a corresponding take-up roller.

In a further embodiment, the exchanging device has a replacement roll holding device for holding at least one replacement roll, on which another coating element is wound, and the replacement roll holding device is disposed relative to the supply roller such that the other coating element on the replacement roll can be connected to the coating element on the supply roller to ensure a continuous coating operation.

In a further embodiment, the arrangement has a wear determination device connected to the exchanging device for determining the wear on the coating element, and the wear determination device is designed such that it generates a control signal for the exchanging device to replace the active portion of the activated coating element with another portion of the same coating element or to replace the entire activated coating element with another coating element when the activated coating element or the active portion of the activated coating element is worn down.

In a further embodiment, the arrangement has a coating element moving device and the wear determination device is suitable for monitoring the drive motor and for identifying a wear of the coating element if a load change in the drive motor is detected.

In a further embodiment, the wear determination device comprises a wear sensor, especially in the form of an image recording device, a light transmission measuring device, a capacitive sensor element or a force sensor.

In a further embodiment, the coating element is made from a material to which at least one reactive system is added, which can detect the local force acting or the local temperature over the entire active coating edge of the coating element or at least a portion thereof.

In a further embodiment, the sensor detects the entire active coating edge of the coating element.

In a further embodiment, the arrangement has a sensor movement device with which the sensor can be moved relative to the coating element for the determination of the wear.

In a further embodiment, the wear determination device has an image recording device for observation of the coating element and an image evaluation device connected to the image recording device, which is suitable for determining the state of wear of the coating element by means of the images of the image recording device.

In a further embodiment, the wear determination device includes a force sensor, which is disposed on or in the coating element and is suitable for measuring the force acting on the coating element during the coating process, and an evaluation device, which identifies the state of wear of the coating element on the basis of the force measurement values.

BRIEF DESCRIPTION OF THE DRAWINGS

Example embodiments of the invention are explained in more detail below with reference to the drawings, in which.

DETAILED DESCRIPTION

Embodiments of the invention provide an arrangement for powder coating that can provide an especially high quality of coated layers.

Thus, the disclosed arrangement has an exchanging device which is suitable for replacing at least one portion of the coating element by another portion of the same coating element or for replacing the entire coating element by another coating element within the process chamber and when the process chamber is closed.

One benefit of the disclosed arrangement is that it enables an exchanging of coating elements with the process chamber closed. An opening of the process chamber and an influencing or impairing of the process conditions present in the process chamber, especially a changing of the temperature and/or the process gases inside the process chamber, can thus be avoided. The quality of the coated layers and the part being fabricated therefore does not suffer from a coating element change.

According to a first embodiment of the arrangement, it is provided that the exchanging device has a multiple head, especially a swivel head or revolver head, on which at least two coating elements are fastened, which can be optionally selected and activated for the coating of the powder on the coating platform. With a multiple head, an exchanging of coating elements can be done especially easily and quickly.

According to another embodiment, it is provided that the exchanging device has an exchanging station, in which one or more other coating elements are stockpiled, and a transport device, which is suitable for replacing the coating element activated in each case for the coating of the powder with one of the other coating elements which are stockpiled in the exchanging station. One benefit of the exchanging station is that an especially large number of replacement coating elements can be stockpiled and thus made available.

According to another embodiment of the arrangement, it is provided that the exchanging device has a moving device, which enables a moving of a portion of the activated coating element being exchanged relative to the coating platform, such that the portion of the coating element being exchanged is pushed out from its assigned coating portion on the coating platform and is replaced by another portion of the same coating element. In this embodiment, no replacement coating elements need to be kept ready; worn-down coating portions are replaced by not yet worn coating portions of the same coating element.

According to another embodiment, it is provided that one part of the coating element is wound onto a supply roller and the exchanging device is configured such that it rolls off a sub-portion of the coating element from the supply roller for exchanging a portion of the coating element to be replaced and rolls up another sub-portion of the coating element onto a corresponding take-up roller. The winding of a coating element onto a supply roller enables an especially space-saving storage of as yet unused coating portions of a coating element inside the process chamber.

In the latter variant, it is seen as being especially advantageous when the exchanging device has a replacement roll holding device for holding at least one replacement roll, on which another coating element is wound, and the replacement roll holding device is disposed relative to the supply roller such that the other coating element on the replacement roll can be connected to the coating element on the supply roller to ensure a continuous coating operation. Thanks to providing one or more replacement rolls, an especially long coating operation can be assured, without having to intervene in the process chamber for the purposes of the coating element exchange.

An exchanging of coating elements and/or an exchanging of portions of coating elements can be done automatically at the end of a predetermined operating time; alternatively, the state of the coating elements can be detected individually and a changing of coating element or coating portions can be done only when the coating element or its portions are in fact worn down. Accordingly, it is seen as advantageous when the arrangement has a wear determination device connected to the exchanging device for determining the wear on the coating element, and the wear determination device is designed such that it generates a control signal for the exchanging device to replace the active portion of the activated coating element with another portion of the same coating element or to replace the entire activated coating element with another coating element when the activated coating element or the active portion of the activated coating element is worn down. The exchanging of the coating element or coating portion thus occurs preferably automatically and in dependence on the actual state of wear.

A wear determination can be done especially easily and thus advantageously when the arrangement has a coating element moving device and the wear determination device is suitable for monitoring the drive motor and for identifying a wear of the coating element if a load change in the drive motor is detected.

In addition or alternatively, the wear determination device can comprise a wear sensor, especially in the form of an image recording device, a light transmission measuring device, a capacitive sensor element or a force sensor.

Preferably, the sensor detects the entire active coating edge of the coating element. Alternatively, it can be provided that the arrangement has a sensor movement device with which the sensor can be moved relative to the coating element for the determination of the wear.

According to one embodiment, it is provided that the wear determination device has an image recording device for observation of the coating element and an image evaluation device connected to the image recording device, which is suitable for determining the state of wear of the coating element by means of the images of the image recording device.

In addition or alternatively, it can be provided that the wear determination device has: a force sensor, which is disposed on or in the coating element and is suitable for measuring the force acting on the coating element during the coating process, and an evaluation device, which identifies the state of wear of the coating element on the basis of the force measurement values.

It is seen as being especially advantageous when the coating element is made from a material to which at least one reactive system is added, which can detect the local force acting or the local temperature over the entire active coating edge of the coating element or at least a portion thereof and put out corresponding measurement values or measurement quantities at the output side for further evaluation.

Figure 1:
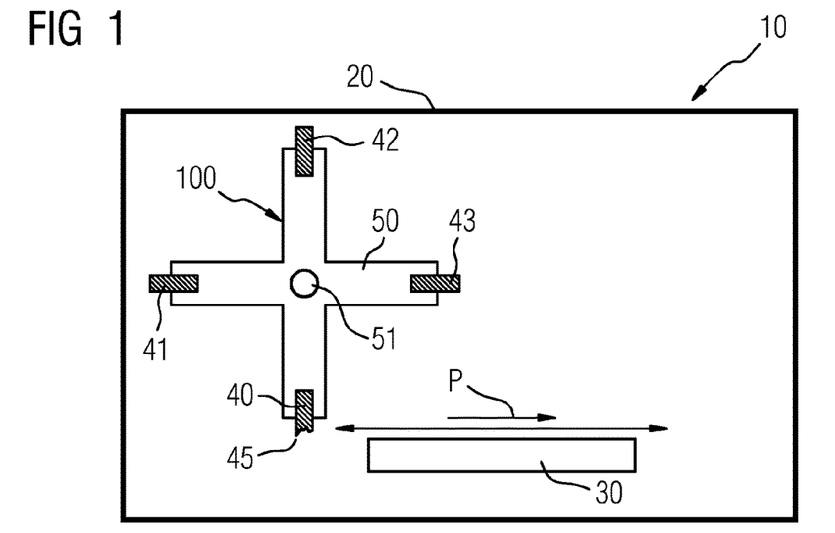
FIG. 1 shows a sample embodiment of an arrangement for coating a powder with an exchanging device, having a multiple head in the form of a swivel or revolver head.

FIG. 1 shows an arrangement 10 for coating of a powder. The arrangement 10 comprises a process chamber 20, in which a coating platform 30 and a coating element 40 in the form of a doctor blade lip is situated. The coating element 40 is held by a multiple head 50 in the form of a swivel or revolver head, on which additional coating elements 41, 42 and 43 are arranged.

The arrangement 10 can be operated as follows for the coating of a powder:

At first, the coating element 40 for the coating of a powder is moved along the direction of the arrow P across the coating platform 30, by which the powder, especially in the form of a metallic or ceramic powder, is deposited on the coating platform 30 and on any powder layers already present there. In the course of the coating of the powder, the coating element 40 becomes worn down in the region of the active doctor blade lip edge 45 which is interacting directly with the coating platform 30.

Once a corresponding wear of the doctor blade lip edge 45 has been detected and/or after a predetermined operating time has expired for the coating element 40, the coating element 40 is replaced by one of the other coating elements 41, 42 or 43 in that the multiple head 50 swivels about its pivot axis 51.

In the sample embodiment of FIG. 1, it is thus possible to place a total of four coating elements 40, 41, 42, and 43 in operation one after the other, without having to open the process chamber 20 and intervene in the process chamber 20. The multiple head 50 forms an exchanging device 100 for the exchanging of the particular active coating element in the sample embodiment of FIG. 1.

Figure 2:
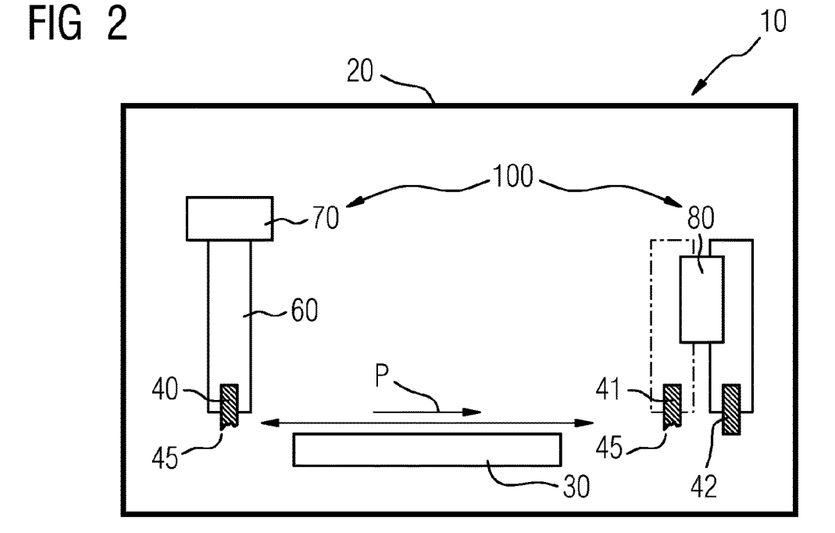
FIG. 2 shows another sample embodiment of an arrangement for coating a powder, wherein the arrangement comprises an exchanging device with a transport device and an exchanging station.

FIG. 2 shows another sample embodiment for an arrangement 10 having a process chamber 20, a coating platform 30 and a coating element 40 in the form of a doctor blade lip. The coating element is held by a holder 60, which is connected to a transport device, only hinted at here.

The transport device 70 serves to move the coating element 40 during the coating of a powder along the direction of the arrow P across the coating platform 30 and thus to coat the powder on the coating platform 30.

Once the coating element 40, especially its doctor blade lip edge 45, has been worn down and/or after a predetermined maximum operating time has been exceeded for the coating element 40, the coating element 40 is replaced by another coating element, which is present in an exchanging station 80 of the arrangement 10. In the sample embodiment of FIG. 2, one notices two additional coating elements 41 and 42, which are kept in the exchanging station 80. One of the two coating elements, namely, the coating element 41, is already worn down, as can be noticed from the worn doctor blade lip edge 45 of the coating element 41. The coating element 42, on the other hand, is still intact and can be used once the coating element 40 is worn down and needs to be replaced.

For the replacing of the coating element 40, the coating element 40 is transported by the transport device 70 to the exchanging station 80 and replaced by the still intact coating element 42. In this process, the coating element 40 is deposited in the exchanging station 80 and the coating element 42 is moved by means of the transport device 70 in the direction of the coating platform 30 so that the further coating of the powder can take place with this new coating element 42.

In the sample embodiment of FIG. 2, the transport device 70 and the exchanging station 80 form an exchanging device 100 with which an exchanging of a coating element 40 used for the coating with another new coating element 42 can be done.

Figure 3:
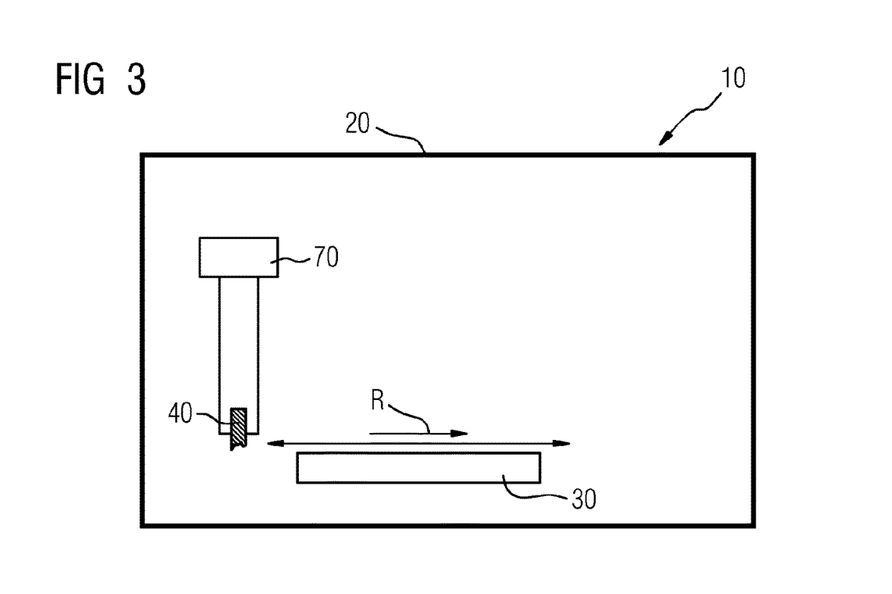
FIG. 3 shows another sample embodiment of an arrangement for coating a powder, wherein the arrangement has a moving device by which a coating element can be moved relative to a coating platform so that an active portion of the coating element is pushed out from the coating portion of the coating platform and is replaced by another portion of the same coating element.

FIG. 3 shows another example of an arrangement 10 for coating a powder. In this sample embodiment, a coating platform 30 and a coating element 40 are located in a process chamber 20, which can move relative to the coating platform so that an active portion for the coating of a powder can be replaced by another, not yet active portion of the coating element. This makes possible the replacing of a worn portion of the coating element 40 with an unworn portion.

In order to enable the replacement of a coating portion in the described manner, a moving device 70 is arranged in the process chamber 20, which makes possible not only a movement of the coating element 40 across the coating platform 30 in the direction of the arrow R but also a moving of the coating element 40 perpendicular to the plane of the image in FIG. 3, i.e., perpendicular to the direction of the arrow R.

Figure 4:
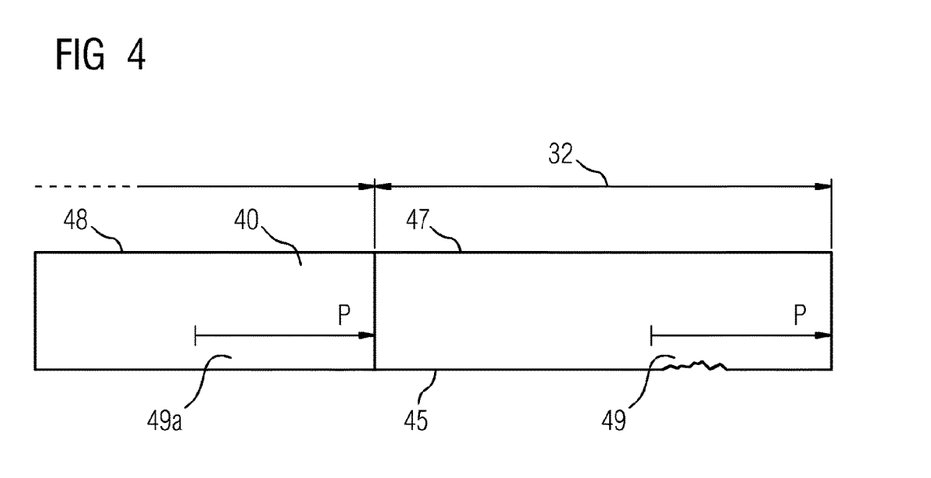
FIG. 4 shows the coating element of FIG. 3 in a front view.

FIG. 4 shows the coating element 40 of FIG. 3 in a front view. One notices the edge of the doctor blade lip edge 45, which lies partly against a coating portion 32 of the coating platform 30 of FIG. 3. This portion can also be called the active portion of the coating element 40. The active coating portion in FIG. 4 is indicated by the reference number 47.

Besides the active coating portion 47, which lies against the coating portion 32 of the coating platform 30, the coating element 40 has a passive coating portion 48, which lies outside the coating portion 32 and at first is not used for the coating of the powder.

If it is determined during the operation of the arrangement or during the coating of a powder that the active coating portion 47 is defective as a whole or at least partly, as shown for example in FIG. 4, the defective portion as indicated by the reference number 49 in FIG. 4 will be replaced with a previously unused portion 49a by a movement of the coating element 40 in the direction of the arrow P in FIG. 4. The defective portion 49 will travel out from the coating portion 32 in this process, so that afterwards it is no longer available for the coating of the powder.

Summarizing, with the moving device 70 in the sample embodiment of FIGS. 3 and 4 it is possible to carry out a movement of the coating element 40 such that defective portions of the coating element are pushed out from the coating portion 32 of the coating platform 30 and are replaced by previously unused and not yet worn-down coating portions of the coating element 40.

In the sample embodiment of FIGS. 3 and 4, the moving device 70 forms an exchanging device with which an exchanging of a portion of the coating element 40 used for the coating with another new portion of the same coating element 40 can occur.

Figure 5:
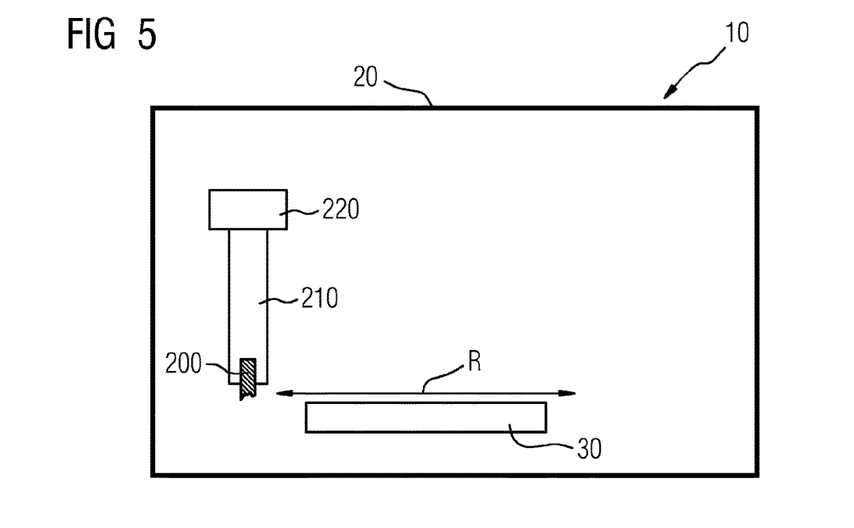
FIG. 5 shows another sample embodiment of an arrangement for coating a powder, wherein a coating element from a supply roller can be wound up onto a take-up roller in order to replace the coating portion active for coating with a new coating portion located on the supply roller.
Figure 6:
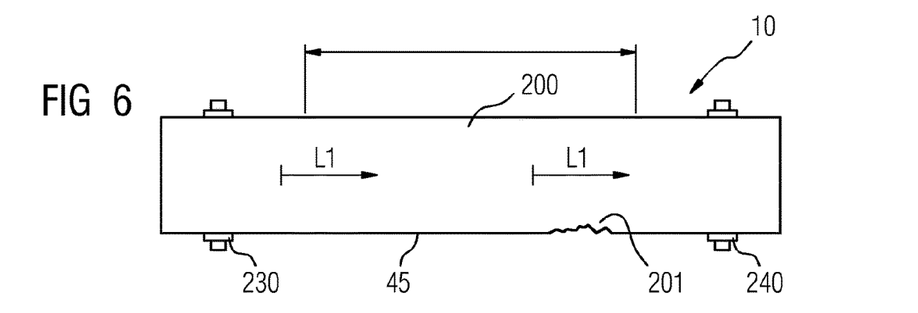
FIG. 6 shows the coating element of FIG. 5 and the supply roller and the take-up roller in a front view.

FIGS. 5 and 6 show another example of an arrangement 10 for coating of a powder. In FIG. 5, one notices a process chamber 20 in which a coating platform 30 and a coating element 200 for coating a powder are present. The coating element 200 is held by a coating element holder 210 and can be moved together with this by means of a moving device 220 across the coating platform 30 in the direction of the arrow R.

The coating element 200 is rolled up in part on a supply roller 230 and in part on a take-up roller 240 (or wear roller), as can be seen in FIG. 6. FIG. 6 shows the coating element 200 of FIG. 5 in a front view.

As can be seen from FIG. 6, it is possible to roll off the coating element 200 from the supply roller 230 and onto the take-up roller 240 in order to move a defective coating portion 201 out from the coating portion 32 of the coating platform 30. Thus, in the sample embodiment of FIG. 6, the defective coating portion 201 can be rolled onto the take-up roller 240 and a corresponding length L1 of coating element is rolled off the supply roller 230, so that the defective coating portion 201 exits from the coating portion 32.

Summarizing, the supply roller 230 and the take-up roller 240 in the sample embodiment of FIGS. 5 and 6 serve to ensure, by rolling off the coating element 200 from the supply roller 230 and rolling it up onto the take-up roller 240, that the portion of the coating element or the doctor blade lip edge 45 lying against the coating portion 32 of the coating platform 30 is always free of defects or largely so. In other words, the supply roller 230 and the take-up roller 240 form an exchanging device with which an exchanging of a portion of the coating element 40 used for the coating with another new portion of the same coating element 40 can be done.

Figure 7:
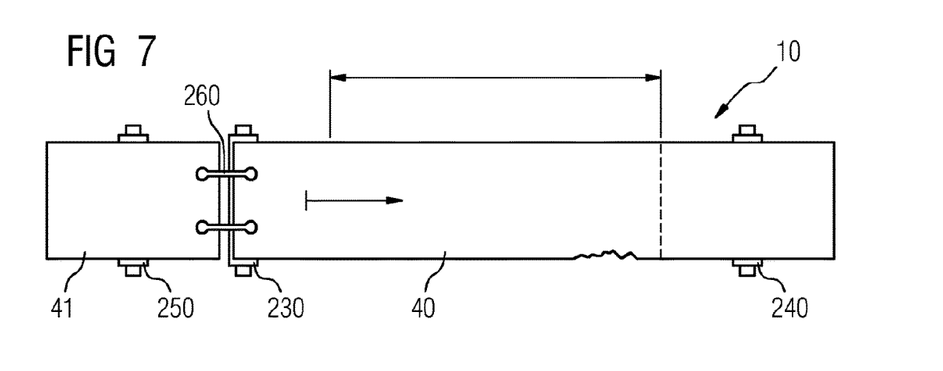
FIG. 7 shows another sample embodiment of an arrangement for coating a powder, wherein there is additionally present besides the supply roller and the take-up roller as per FIGS. 5 and 6 a replacement roller with another coating element, which can replace the coating element wound on the supply roller as soon as it has been completely rolled off from the supply roller.

FIG. 7 shows a modification of the sample embodiment of FIGS. 5 and 6. As can be seen, the arrangement 10 has, in addition to the supply roller 230 and the take-up roller 240, a replacement roller 250, on which a further coating element 41 is wound. The coating element 41 wound on the replacement roller 250 is joined to the coating element 40 wound on the supply roller 230 by means of connection elements 260 so that, after completely rolling the coating element 40 off from the supply roller 230, the coating element 41 can then be rolled off from the replacement roller 250 and moved into the coating portion 32 of the coating platform 30.

Thus, in the sample embodiment of FIG. 7 there are two coating elements 40 and 41 available for the coating of a powder, wherein the coating element 41 is used only when the coating element 40 has been entirely rolled off from the supply roller 230. In a corresponding manner, further coating elements and further replacement rollers can be provided in cascaded form.

In the sample embodiment of FIG. 7, the supply roller 230, the take-up roller 240 and the replacement roller 250 form an exchanging device with which an exchanging of a portion of a coating element 40 used for the coating with another new portion of the same coating element 40 or another coating element 41 can occur.

Figure 8:
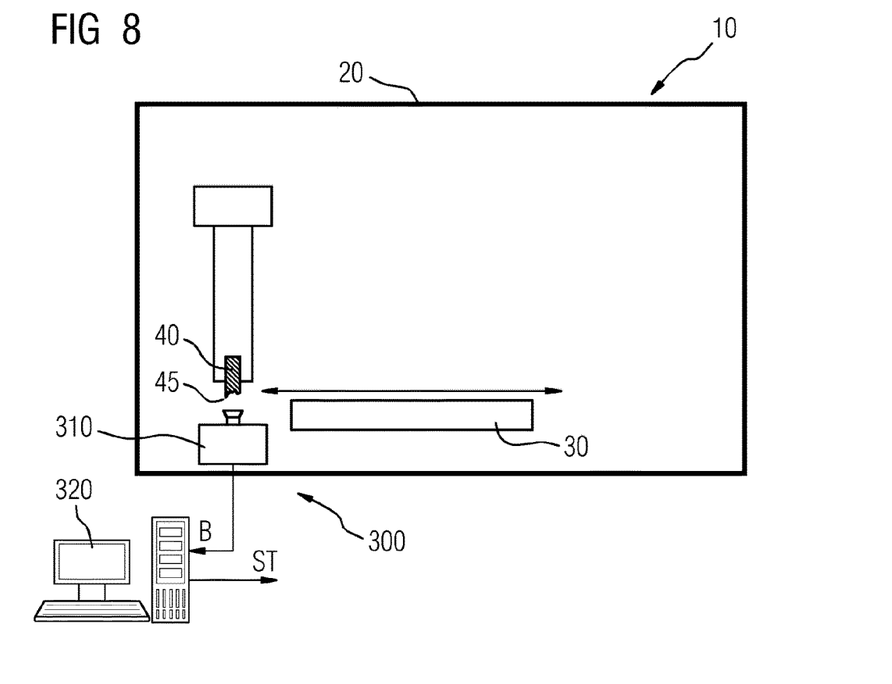
FIG. 8 shows another sample embodiment of an arrangement for coating a powder, wherein besides an exchanging device (not shown) there is present a wear determination device, comprising an image recording device and an image evaluation device.

FIG. 8 shows a sample embodiment of an arrangement 10 for the coating of a powder in which in addition to an exchanging device, not further depicted, there is present a wear determination device 300, with which the wear of the coating element 40 can be determined.

The wear determination device 300 in the sample embodiment of FIG. 8 has an image recording device 310 in the form of a camera, which can be arranged either inside the process chamber 20 or outside the process chamber 20. The image recording device 310 is connected to an image evaluation device 320, such as one in the form of a computer.

During the operation of the arrangement 10, i.e., during the coating of a powder on the coating platform 30, the doctor blade lip edge 45 of the coating element 40 is observed with the image recording device 310. The images B furnished by the image recording device 310 are transmitted to the image evaluation device 320, which evaluates the images by means of a computer-assisted image evaluation process and makes a conclusion as to the state of wear of the doctor blade lip edge 45, for example, by image comparison.

Once the image evaluation device 320 determines in the course of the image evaluation that the doctor blade lip edge 45 of the coating element is worn down, it generates a control signal ST, which is transmitted to an exchanging device not shown in FIG. 8 for reasons of clarity, in order to initiate a replacement of the coating element 40 as a whole or a replacement of a sub-portion of the coating element 40, as already discussed in detail above for example in the context of FIGS. 1 to 7.

Figure 9:
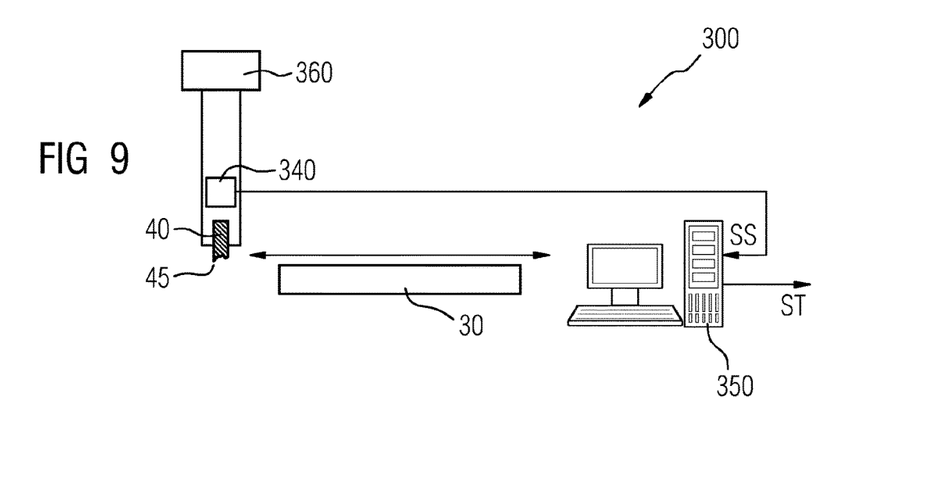
FIG. 9 shows another sample embodiment of a wear determination device of an arrangement for coating a powder, wherein the wear determination device has a sensor, especially a load sensor, which is disposed in the region of a coating element holder of the coating element.

FIG. 9 shows another sample embodiment of a wear determination device 300 which can be used in an arrangement for coating a powder on a coating platform 30. In the sample embodiment of FIG. 9, the wear determination device 300 comprises a sensor 340, especially one in the form of a load sensor, which measures the load acting on the coating element 40 and transmits it to a signal processing device 350 connected to the sensor 340. The signal processing device 350 evaluates the sensor signals SS furnished by the sensor 340 and generates a control signal ST on the output side if it can be concluded from the signals SS of the sensor 340 that the doctor blade lip edge 45 of the coating element is worn down or at least might be worn.

In the sample embodiment of FIG. 9, the sensor 340 is arranged in the region of the coating element holder 360 holding the coating element 40. Alternatively, the sensor 340 can also be arranged at another site, as will be explained in more detail below with the aid of the following sample embodiment. The sensor 340 can be, for example a force sensor, which measures the mechanical force acting on the coating element 40, especially the doctor blade lip edge 45, and/or the temperature of the coating element 40.

Figure 10:
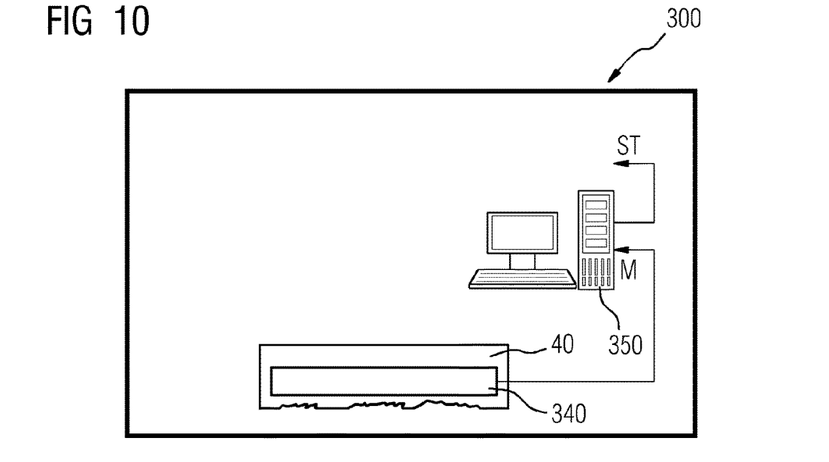
FIG. 10 shows another sample embodiment of a wear determination device of an arrangement for coating a powder, wherein the wear determination device has a sensor, especially a load sensor, which is disposed in the region of the coating element, for example, on the outside of the coating element.

FIG. 10 shows another example of a sensor 340 which can be used in the wear determination device 300 of FIG. 9. In the sample embodiment of FIG. 10, the sensor 340 is arranged not inside the coating element holder 360 as per FIG. 9, but instead on the outside of the coating element 40. Preferably, the sensor 340 extends along the entire width of the coating element by which the coating element 40 lies on the coating platform 30 (see FIG. 9), in order to be able to detect the state of the coating element 40 in the especially loaded region of the coating element.

The sensor 340 can measure the load of the coating element 40, such as the force loading and/or the temperature load of the coating element 40, pinpointed along the width of the coating element 40 and relay corresponding pinpointed measurement values M to the signal processing device 350 of the wear determination device 300. Alternatively or in addition, an averaged load measurement value M indicating a mean load value over the width of the coating element 40 can be transmitted to the signal processing device 350. The sensor 340 can be, for example, a strain gauge strip.

Figure 11:
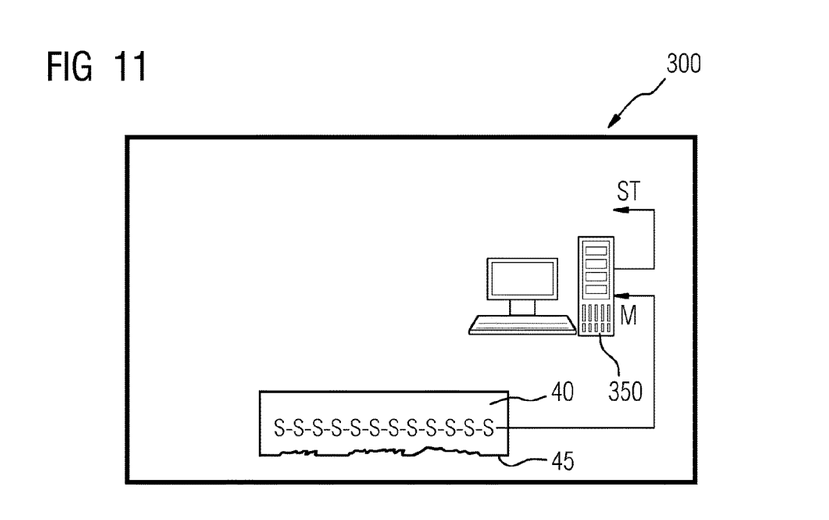
FIG. 11 shows another sample embodiment of a wear determination device of an arrangement for coating a powder, wherein a sensor, especially a load sensor, of the wear determination device is integrated in the sensor element and a pinpointed determination of the loading and/or the wear on the coating element is made possible.

FIG. 11 shows a sample embodiment of a wear determination device 300 in which the coating element 40 is made from a material to which at least one reactive system has been added, which can detect the local force and/or the local temperature acting on the entire active doctor blade lip edge 45 of the coating element 40. The reactive system forms a plurality of sensors S, which are arranged alongside each other in the region of the doctor blade lip edge 45 and enable a pinpointed measurement of the state of the doctor blade lip edge 45 of the coating element 40. The measurement values M of the sensors S arrive at a signal processing device 350, which evaluates the measurement values M and triggers a control signal ST for replacement of the active coating element 40 once a corresponding wear of the coating element 40 has been determined.

Figure 12:
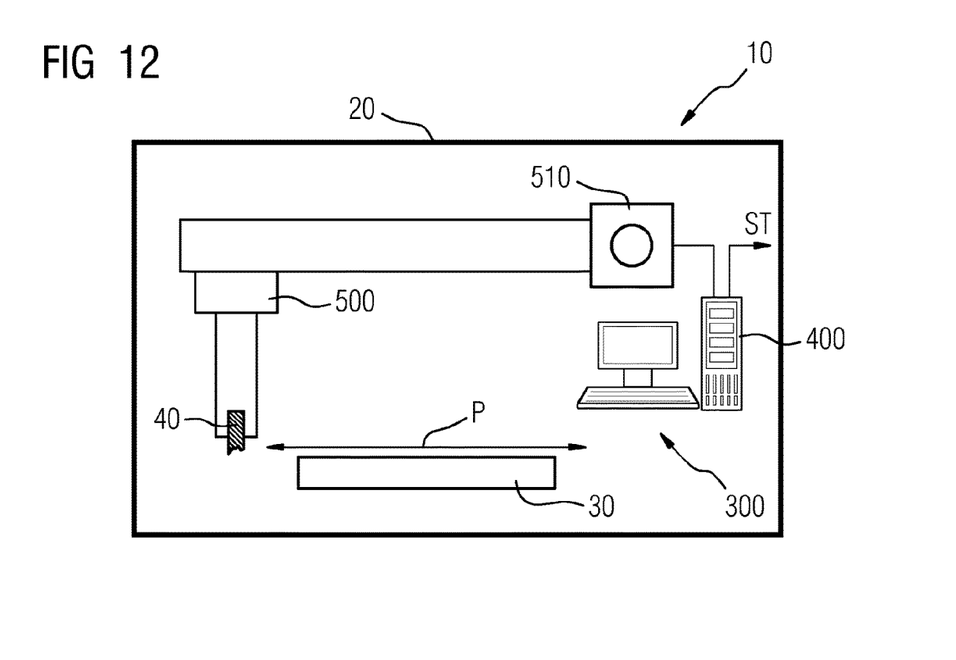
FIG. 12 shows another sample embodiment of a wear determination device of an arrangement for coating a powder, wherein the wear determination device has a control device for actuating a drive motor serving to move the coating element via the coating platform, and wherein the control device detects the load of he drive motor, especially the current flow through the drive motor, and identifies the wear of the coating element in dependence on the load of the drive motor.

FIG. 12 shows another sample embodiment of an arrangement 10 for the coating of a powder. The arrangement 10 comprises a process chamber, in which a coating platform 30 and a coating element 40 are arranged. The coating element 40 is moved by a moving device 500 across the coating platform 30 in order to enable the coating of a powder on the coating platform 30.

The moving device 500 comprises a drive motor 510, which is monitored by a wear determination device 300. The wear determination device 300 has a control device 400, which monitors the loading state of the drive motor 510, especially the current flow through the drive motor 510, and concludes that the coating element 40 is worn if the loading of the drive motor 510 increases during the coating operation and/or changes too much over time beyond a predetermined degree of load change. If the wear device 300 determines in the course of the monitoring of the drive motor 510 that the coating element 40 is presumably worn down, it generates a control signal ST with which a replacement of the coating element 40 with a new or not yet worn coating element is brought about with the exchanging device, not shown in FIG. 12.

Figure 13:
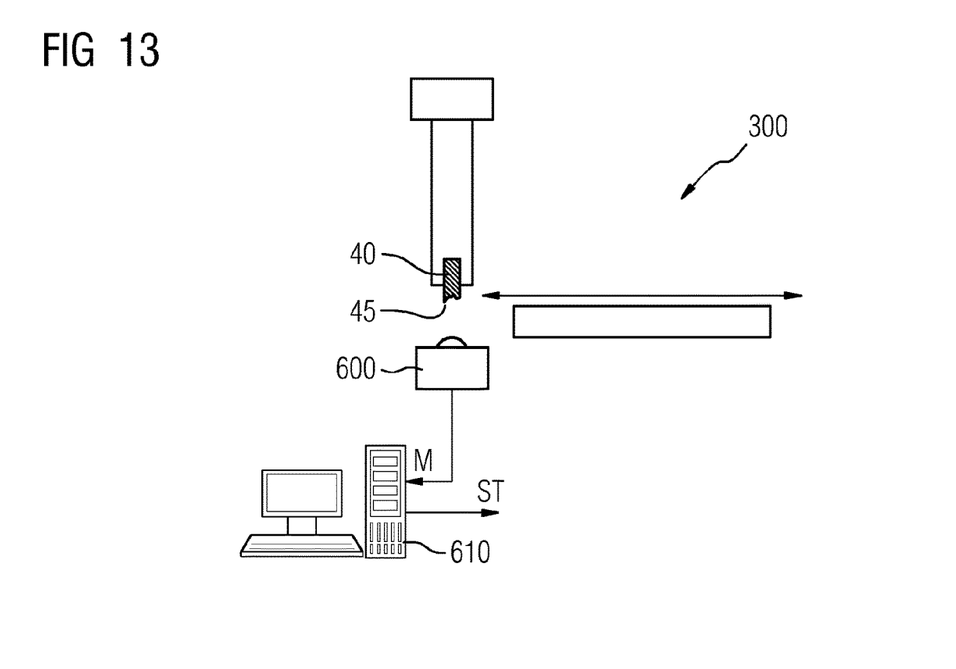
FIG. 13 shows another sample embodiment of an arrangement for coating a powder with a wear determination device, wherein the wear determination device comprises a sensor for determining the wear of the coating element and the sensor can move along the length of the coating element.

FIG. 13 shows a sample embodiment of a wear determination device 300 in which a sensor 600 can travel by means of a sensor transport device, not illustrated further, along the doctor blade lip edge 45 of the coating element 40 in order to make possible a pinpointed measurement of the state of the doctor blade lip edge 45. The measurement values M of the sensor 600 arrive at a signal processing device 610, which evaluates the measurement values M and generates a control signal ST once the measurement values M of the sensor 600 indicate a worn doctor blade lip edge 45.

Figure 14:
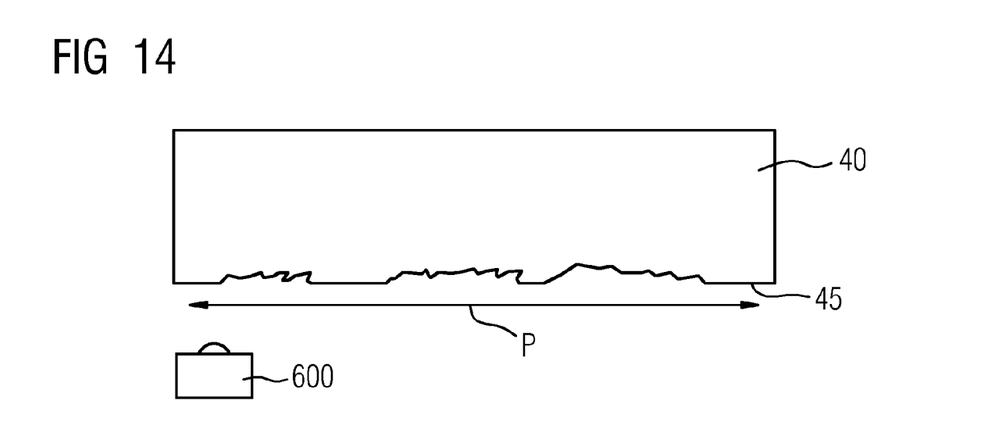
FIG. 14 shows the moving ability of the sensor as per FIG. 13 in a front view.

FIG. 14 shows the travel of the sensor 600 as per FIG. 13 along the doctor blade lip edge 45 in greater detail. The direction of travel by which the sensor 600 is moved past the doctor blade lip edge 45 by means of the sensor transport device is indicated in FIG. 14 by reference symbol P.

Figure 15:
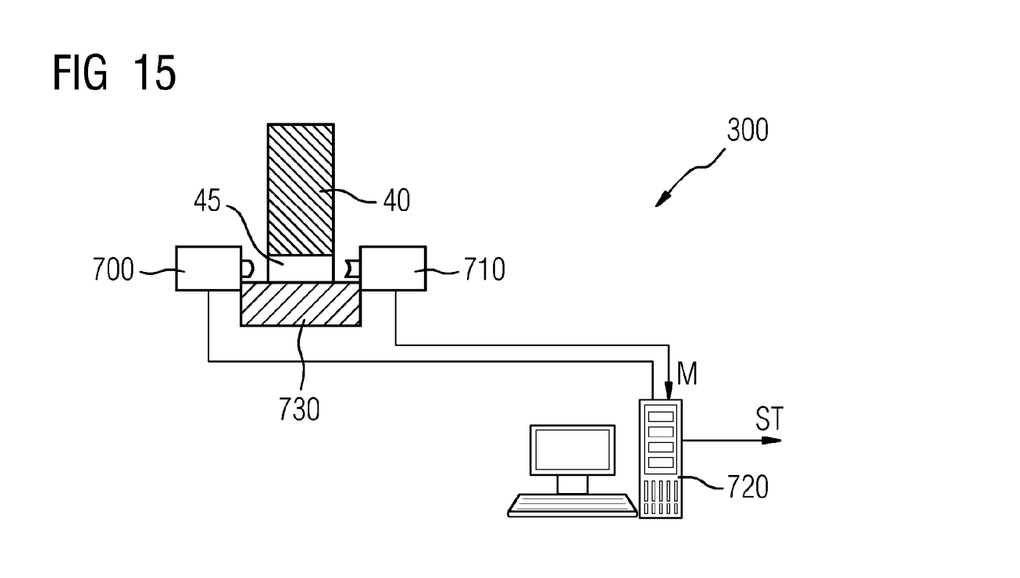
FIG. 15 shows another sample embodiment of a wear determination device of an arrangement for coating a powder, wherein the wear determination device has a transmitting unit and a receiving unit with which the degree of wear of the coating element is detected.

FIG. 15 shows a sample embodiment of a wear determination device 300 which has a transmitting unit 700 and an assigned receiving device 710. With the transmitting device 700, a beam is generated, such as an electromagnetic radiation in the form of light, such as infrared light or UV light, and sent in the direction of the doctor blade lip edge 45 of the coating element 40. The radiation penetrates and/or passes through the doctor blade lip edge 45 and is measured by the receiving device 710.

The measurement values M received by the receiving device 710 arrive at a signal processing device 720, which evaluates the measurement values M and can determine whether the doctor blade lip edge 45 is worn down. In order to avoid measurement errors, such as those due to reflection of the radiation produced by the transmitting unit 700, a screening unit 730 is provided in addition in the sample embodiment of FIG. 15, which closes off the radiation link between the transmitting unit 700 and the receiving unit 710 at the bottom in the representation of FIG. 15.

Although the invention has been described in detail and illustrated closely by preferred sample embodiments, the invention is not limited by the examples disclosed and other variations can be derived from them by the skilled person, without leaving the scope of protection of the invention.

What is claimed is:

1. An arrangement for the coating of a powder, the arrangement comprising:
 a process chamber,
 a coating platform located in the process chamber,
 a coating device with a coating element located in the process chamber,
 an exchanging station in which one or more other coating elements are stockpiled, and an exchanging device configured to:
- access other coating elements stockpiled in the exchanging device,
- remove the coating element from the exchanging device, and
- replace each coating element activated for the coating of the powder with one of the other coating elements stockpiled in the exchanging station within the process chamber and when the process chamber is closed.

2. The arrangement of claim 1, wherein:
the arrangement has a wear determination device connected to the exchanging device for determining the wear on the coating element, and
the wear determination device is configured to generate a control signal for the exchanging device to replace the active portion of the activated coating element with another portion of the same coating element or to replace the entire activated coating element with another coating element when the activated coating element or the active portion of the activated coating element is worn down.

3. The arrangement of claim 2, wherein:
the arrangement has a coating element moving device, and
the wear determination device is configured to monitor the drive motor and to identify a wear of the coating element in response to detecting a load change in the drive motor.

4. The arrangement of claim 2, wherein the wear determination device comprises a wear sensor comprising an image recording device, a light transmission measuring device, a capacitive sensor element, or a force sensor.

5. The arrangement of claim 4, wherein the sensor is configured to detect the entire active coating edge of the coating element.

6. The arrangement of claim 4, wherein the arrangement has a sensor movement device with which the sensor can be moved relative to the coating element for the determination of the wear.

7. The arrangement of claim 2, wherein the coating element is made from a material including at least one reactive system that can detect a local force acting or a local temperature over the entire active coating edge of the coating element or at least a portion thereof.

8. The arrangement of claim 2, wherein the wear determination device has an image recording device for observation of the coating element and an image evaluation device connected to the image recording device and configured for determining the state of wear of the coating element based on images of the image recording device.

9. The arrangement of claim 2, wherein the wear determination device comprises:
a force sensor located on or in the coating element and configured to measure a force acting on the coating element during the coating process, and
an evaluation device configured to identify a state of wear of the coating element based on the force measured by the force sensor.

10. An arrangement for the coating of a powder, the arrangement comprising:
a process chamber,
a coating platform located in the process chamber,
a coating device with a coating element located in the process chamber,
an exchanging device configured to move a portion of the coating element relative to the coating platform, such that the portion of the coating element being exchanged is pushed out from an assigned coating portion on the coating platform and replaced by another portion of the same coating element.

* * * * *